United States Patent [19]

Beberman et al.

[11] Patent Number: 4,842,533
[45] Date of Patent: Jun. 27, 1989

[54] THERMALLY EFFICIENT SPLICE JOINT FOR ELECTRICAL DISTRIBUTION BUSWAY

[75] Inventors: Julie A. Beberman, New Hartford; Ira B. Goldman, Waterbury; Harold F. Larkin, Plainville; David A. Hibbert, South Windsor, all of Conn.

[73] Assignee: General Electric Company, New York, N.Y.

[21] Appl. No.: 193,000

[22] Filed: May 12, 1988

[51] Int. Cl.⁴ .......................................... H01R 13/60
[52] U.S. Cl. .................................. 439/213; 174/88 B
[58] Field of Search ........................... 174/71 B, 88 B; 439/210, 212, 213

[56] References Cited
U.S. PATENT DOCUMENTS 3,104,276 9/1963 Cataldo et al. .................... 439/213
3,183,298 5/1965 Weimer et al. .................... 174/88 B
3,365,537 1/1968 Fehr, Jr. et al. .................... 174/88
3,786,394 1/1974 Koenig et al. .................... 339/22 B
4,009,920 3/1977 Hicks, Jr. et al. .................... 439/213
4,705,334 11/1987 Slicer et al. .................... 439/210

Primary Examiner—Gary F. Paumen
Attorney, Agent, or Firm—Richard A. Menelly; Walter C. Bernkopf; Fred Jacob

[57] ABSTRACT

A thermally efficient joint for electrical power distribution busway electrically connects between adjacent busway sections. Each busway joint includes a modular assembly containing spaced metallic splice plates separated by corresponding insulating plates. The module is sandwiched between a pair of joint covers by means of an insulated thru-bolt. The spacing between the splice joint for receiving corresponding busway stabs is accurately set by an apertured depression stamped within each of the splice plates.

18 Claims, 8 Drawing Sheets

THERMALLY EFFICIENT SPLICE JOINT FOR ELECTRICAL DISTRIBUTION BUSWAY

BACKGROUND OF THE INVENTION

Power busway used within multi-phase electric power distribution systems generally consists of long, rectangular bars of copper or aluminum material with each invididual bar electrically insulated to maintain electrical isolation between the individual phases as well as between the phase conductors and the neutral conductors. U.S. Patent Application Ser. No. 122,863 filed Nov. 19, 1987 entitled "Thermally Efficient Power Busway Housing" describes a power busway utilizing insulated bolts to tightly hold the bars in good thermal proximity with insulative coatings on the individual buses to maintain electrical integrity between the separate phases. This Application is incorporated herein for purposes of reference.

U.S. Pat. No. 3,365,537 describes a thru-bolt busway joint for joining adjacent sections of an electric power busway wherein electrical splice plates are spaced to receive uninsulated bus extensions from adjoining busway sections. The metallic splice plates are positionally spaced within the busway joints by means of embossments formed on the molded insulating plates that are interleaved between the bus conductors. Besides providing spacing between the metallic splice plates, the formed embossment also provides anti-turn facility to the plates when the thru-bolt is inserted within the plates to connect the busway joint between the adjacent busway sections.

U.S. Pat. No. 4,705,334 describes a busway joint which includes metallic splice plates interleaved with insulating plastic barriers. The plastic barriers include molded ribs formed thereon which cooperate with a square insulating tube to provide anti-turn function to the splice plates and barriers as well as to insulate the thru-bolt connector. Additionally, U.S. Pat. No. 3,786,394 describes an insulated tube of oval cross-section used with busway joints for the same purpose.

The use of molded insulating plates or barriers between metallic splice plates to prevent turning and to set the spacing between the splice plates adds considerable expense to the busway joint assembly. The instant invention improves thereover by utilizing inexpensive stamped plates of a glass-filled polyester material having good thermal conducting properties as well as good electrically insulating properties and provides apertured depressions within each of the splice plates to automatically set the required spacing.

SUMMARY OF THE INVENTION

An electric busway joint for connecting between adjacent sections of electrical busway includes a plurality of shaped and apertured metal splice plates interleaved with corresponding glass-filled polyester apertured insulating plates. The shaped splice plates are configured to provide busway stab-receiving spaces for each phase of a multi-phase power system. An insulated thru-bolt extends transversely through the apertured metal splice plates and apertured insulating plates to securely fasten the busway joint to adjacent electrical busway sections. An alternate embodiment includes an insulative coating on all but the contacting surface of the splice plates and eliminates the intervening insulating plates.

DESCRIPTION OF THE PREFERRED EMBODIMENT

Figure 1:
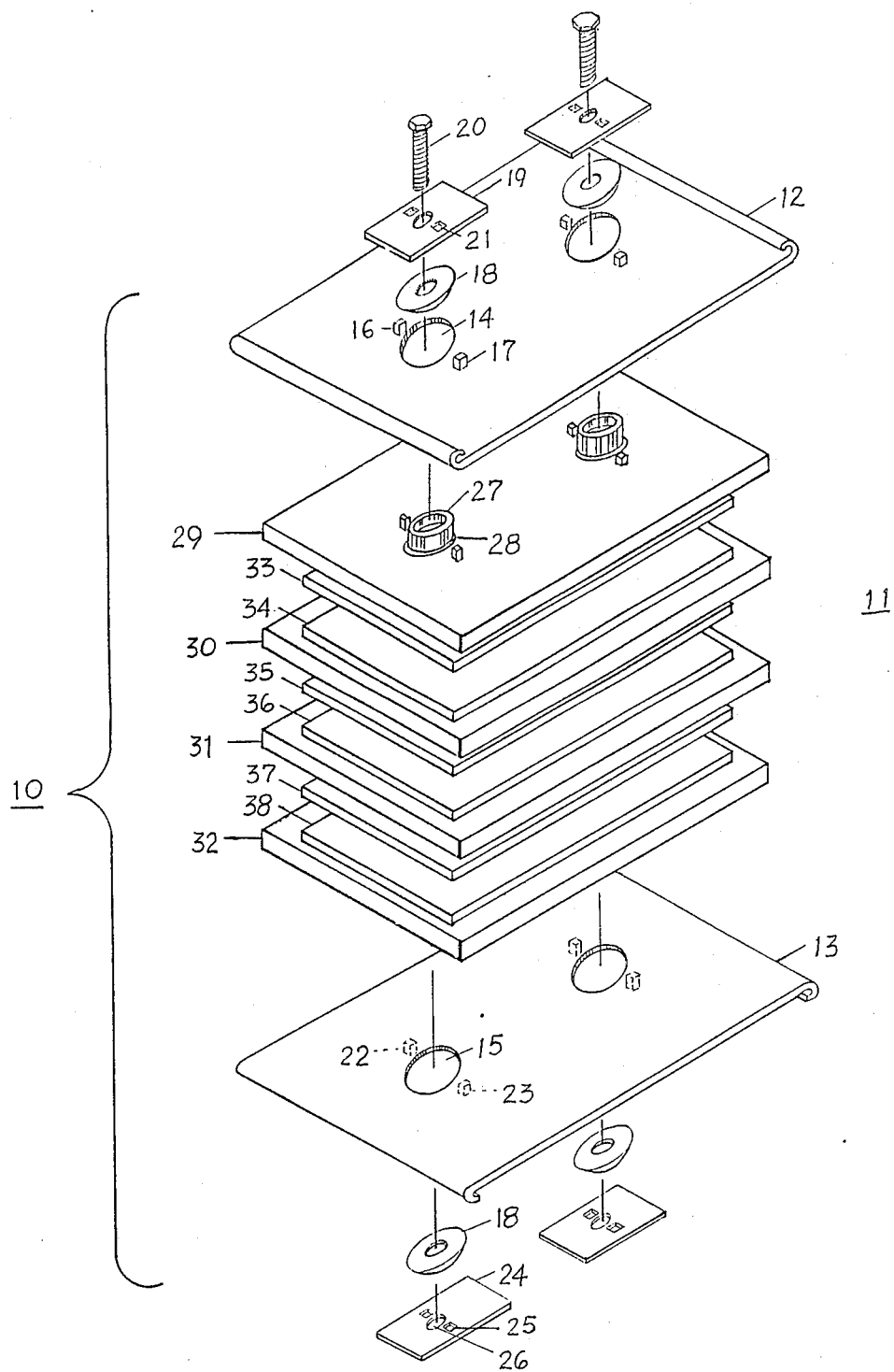
FIG. 1 is a top perspective view in isometric projection of a double busway joint according to the invention.

A double busway joint 10 is shown in FIG. 1 to consist of a three-phase busway connector module 11 arranged between a pair of outer housing plates 12 and 13. The connector module includes successive apertured metal splice plates 33–38 with corresponding apertured insulating plates 29–32 for insulating between the splice plates as well as between the outer housing plates 12 and 13. Anti-turn insulating tubes 27 of oval cross-section are inserted within corresponding oval-shaped openings 28 formed through the metal splice plates and the insulating plates and through the circular openings 14, 15 formed through the outer housing plates 12, 13. Prevention of turning provided by the outer housing plates 12, 13 through the anti-turn lugs 16, 17 and 22, 23 which cooperate with slotted openings 21, 25 formed in the rectangular washers 19 and 24 respectively. Belville washers 18 are arranged on the outer surface of both of the outer housing plates tk provide added compressive force to the outer plates when attached together by means of cylindrical bolts 20. Although only three bus conductors are disclosed herein, this is by way of example only. It is to be clearly understood that additional bus conductors such as neutral and ground conductors are also included within the scope of this invention.

Figure 2:
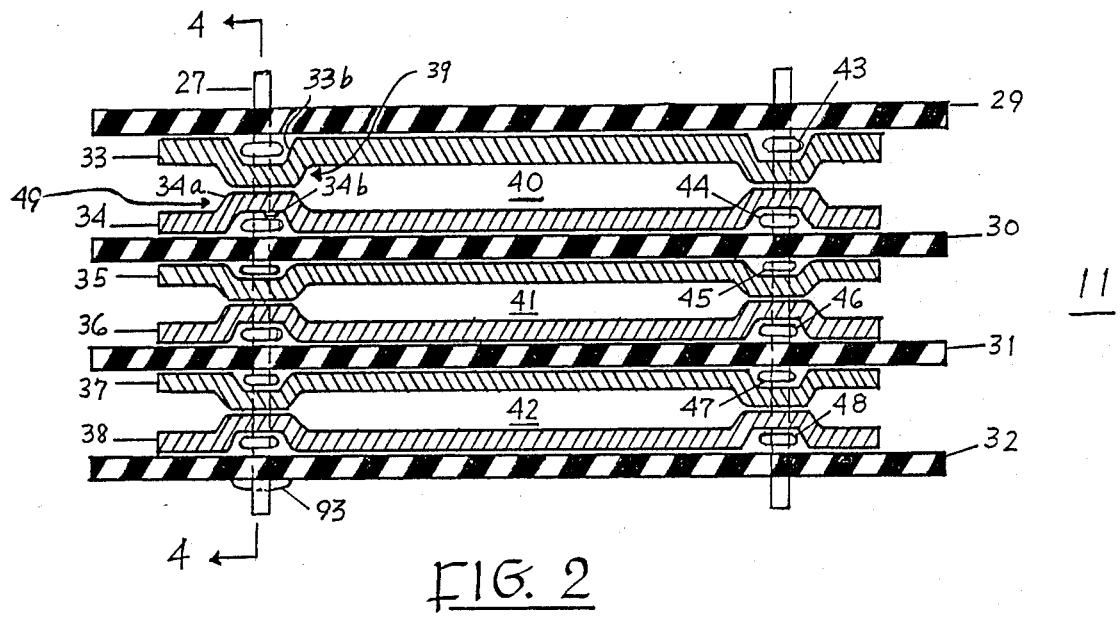
FIG. 2 is an end view in section of the busway connector module used within the double busway joint of FIG. 1.
Figure 4:
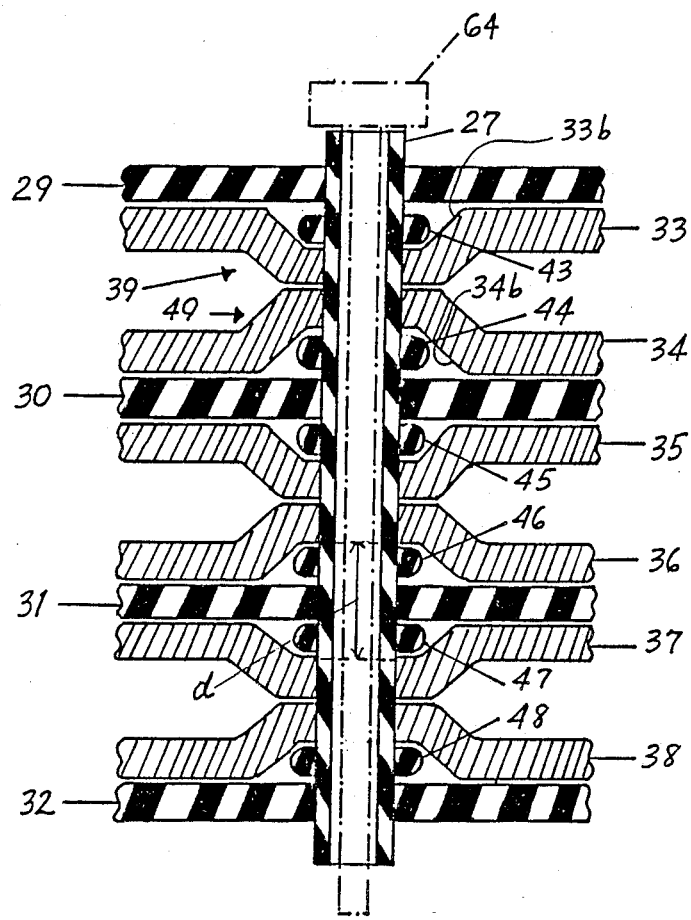
FIG. 4 is a partial section view of the connector module of FIG. 2 viewed in the 4—4 plane.

The connector module 11 is shown in FIGS. 2 and 4 to illustrate the busway stab spaces 40-42 defined between the respective pairs of splice plates 33, 34; 35, 36 and 37, 38 and insulating plates 29-32. The space is provided by means of an apertured depression such as 39 stamped within the first metal splice plate 33 and the apertured depression 49 formed in the opposing splice plate 34. The apertured depressions are formed within the metal by a stamping process which results in a recess 33b at one side and a projection 33a at an opposite side thereof for the metal splice plate 33 which abuts the projection 34a opposite the recess 34b on the opposing splice plate 34. Besides providing accurate spacing to receive the bus stabs from adjoining busway sections, it has been determined that the projections on the opposing splice plates also keep the splice plates from bowing toward each other under the magnetic attraction forces occurring therebetween under exess current transport through the busway sections. To insure good electrical resistive properties in the connector module, a plurality of elastomeric washers 43–48 are inserted within the recesses formed within each of the individual apertured depressions. To securely hold the insulating tubes 27 to the connector module and to improve the electrical resistive properties thereof, a bead of adhesive material can be applied to every interface between the insulating plates 29–32 with the insulative tube as indicated at 93.

Figure 3:
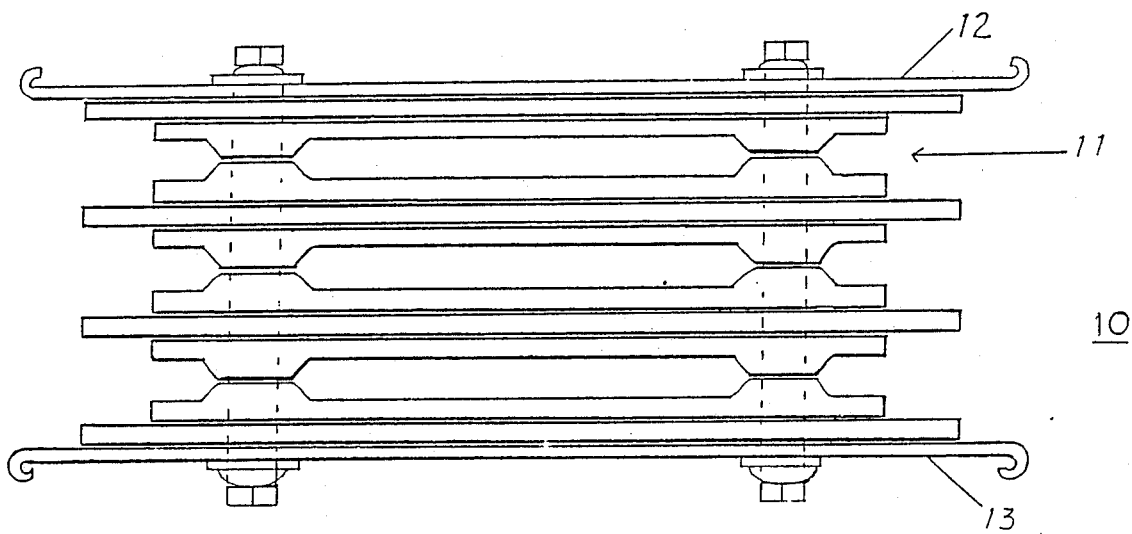
FIG. 3 is an end view of the double busway joint of FIG. 1 after assembly.

The assembled double busway joint 10 is shown in FIG. 3 to illustrate the close fit relation between the connector module 11 and the outer housing plates 12 and 13. The arrangement of the elastomeric washers 43 and 44, for example, within respective recesses 33b and 34b is illustrated in the connector module 11 depicted in FIG. 4. It is noted that the thickness of the elastomeric washers 46, 47, add to the thickness of each of the respective insulating plates such as indicated with respect to insulating plates 31 to provide an increased thickness d between successive splice plates 36, 37. This is an important feature of the invention because the oval insulating tube 27 that passes through the respective splice plates 33–38 and insulating plates 29–32 encompasses the metallic bolt 64, indicated in phantom which could otherwise provide a continuous conductive path between the splice plates. This increased thickness of insulative material adds to the insulative properties of the oval insulating tube to further insure that no electrical breakdown occurs between the successive splice plates.

Figure 5:
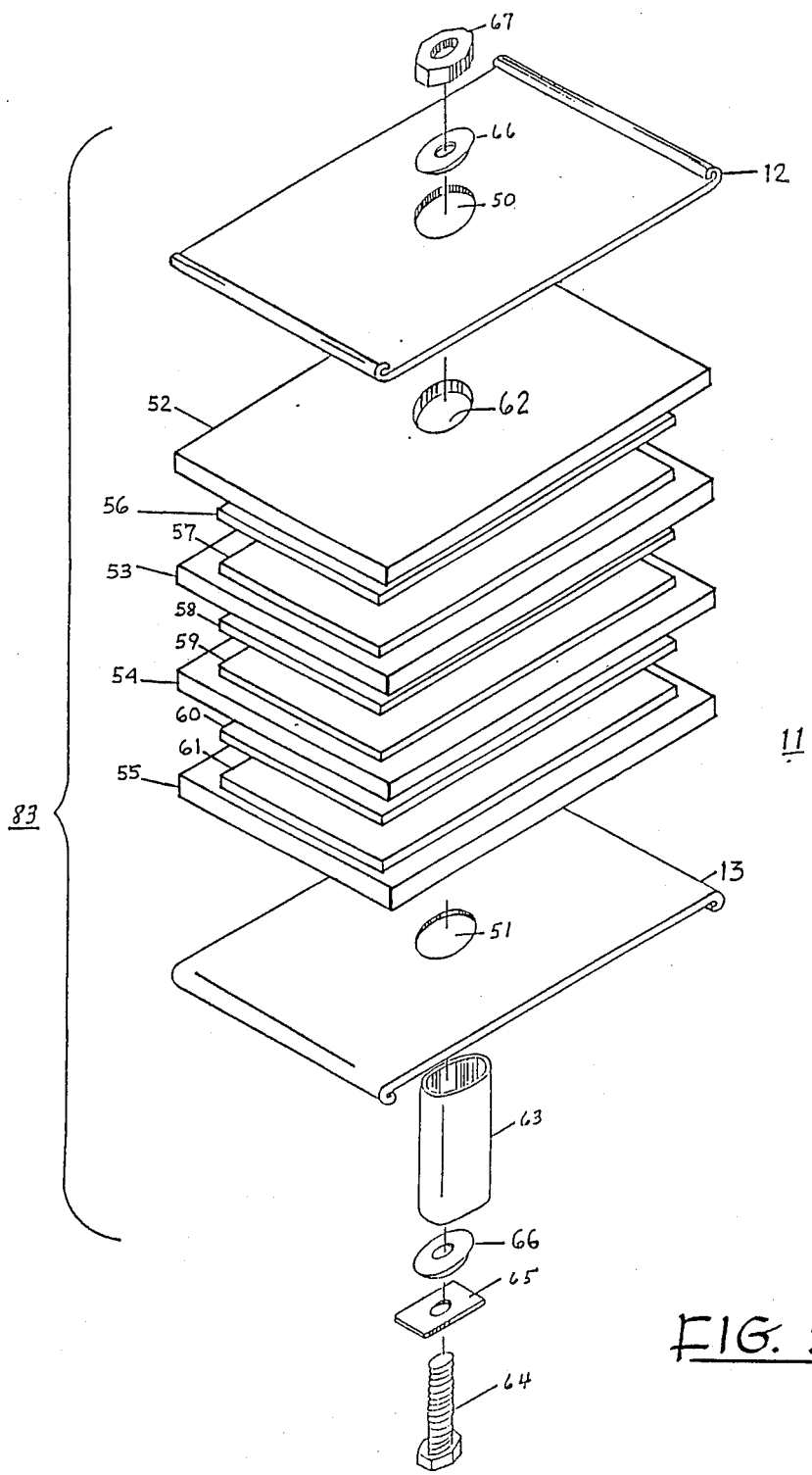
FIG. 5 is a top perspective view in isometric projection of a single busway joint in accordance with the invention.

A single busway joint 83 is depicted in FIG. 5 to comprise a connector module 11 similar to that described earlier and which contains insulating plates 52–55 and splice plates 56–61 arranged similar to those described earlier with reference to the previous figures. An oval-shaped opening 62 is punched through each of the insulating and splice plates within the connector module for receiving the oval insulating tube 63 which provides anti-turn properties to each of the splice plates during the assembly process and thereafter when the busway joint is disassembled from the busway. Once the oval insulating tube has been inserted within the connecting module, the outer housing plates 12, 13 which include oval or circular openings 50, 51 are then assembled by means of the Belville washers 66, rectangular washers 65, bolt 64 and threaded nut 67.

Figure 6:
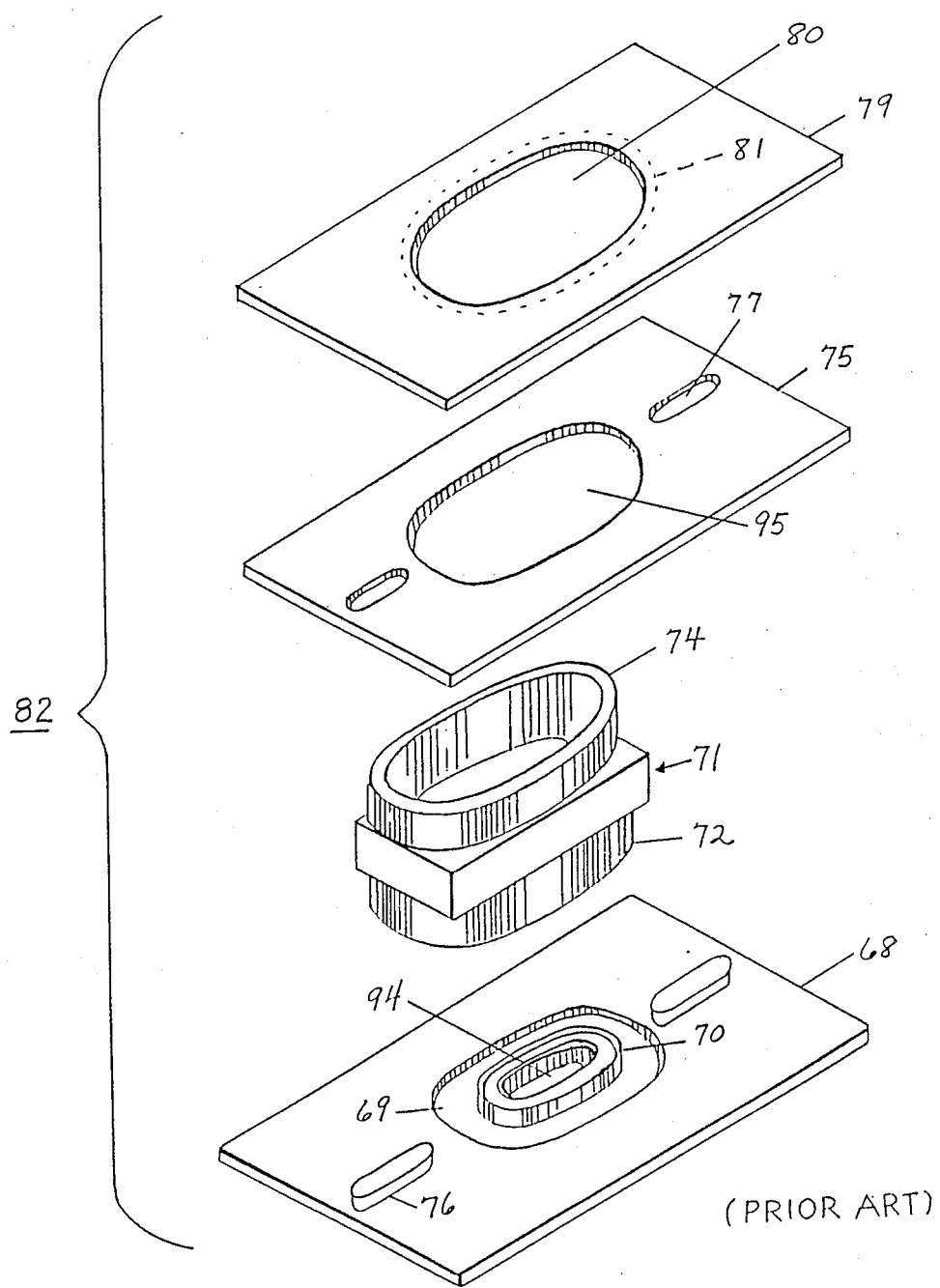
FIG. 6 is a top perspective view of a splice plate and insulating plate arrangement according to the prior art.

A single section of a prior art busway joint 82 is depicted in FIG. 6 to illustrate the function of a molded plastic plate 68 wherein anti-turn pins 76 are integrally molded on one surface thereof and a raised lip portion 70 encompasses an oval-shaped opening 94 which is in turn surrounded by an oval recess 69. This arrangement integrally formed during the molded plastic forming process allows the molded plastic connector 71 to encompass the raised lip 70 and seat within the oval recess 69 by means of the oval bottom part 72. The oval top part 74 extends through an oversized opening 95 within the adjoining metal splice plate 75 and is received within the oval-shaped recess 81 formed on the adjacent side of an opposite insulating plate 79 around an oval opening 80. The anti-turn pin 76 on the insulative plate 68 nests within the anti-turn slots 77 formed in the metal splice plate 75 on opposite sides of the splice plate oval opening 95.

Figure 7:
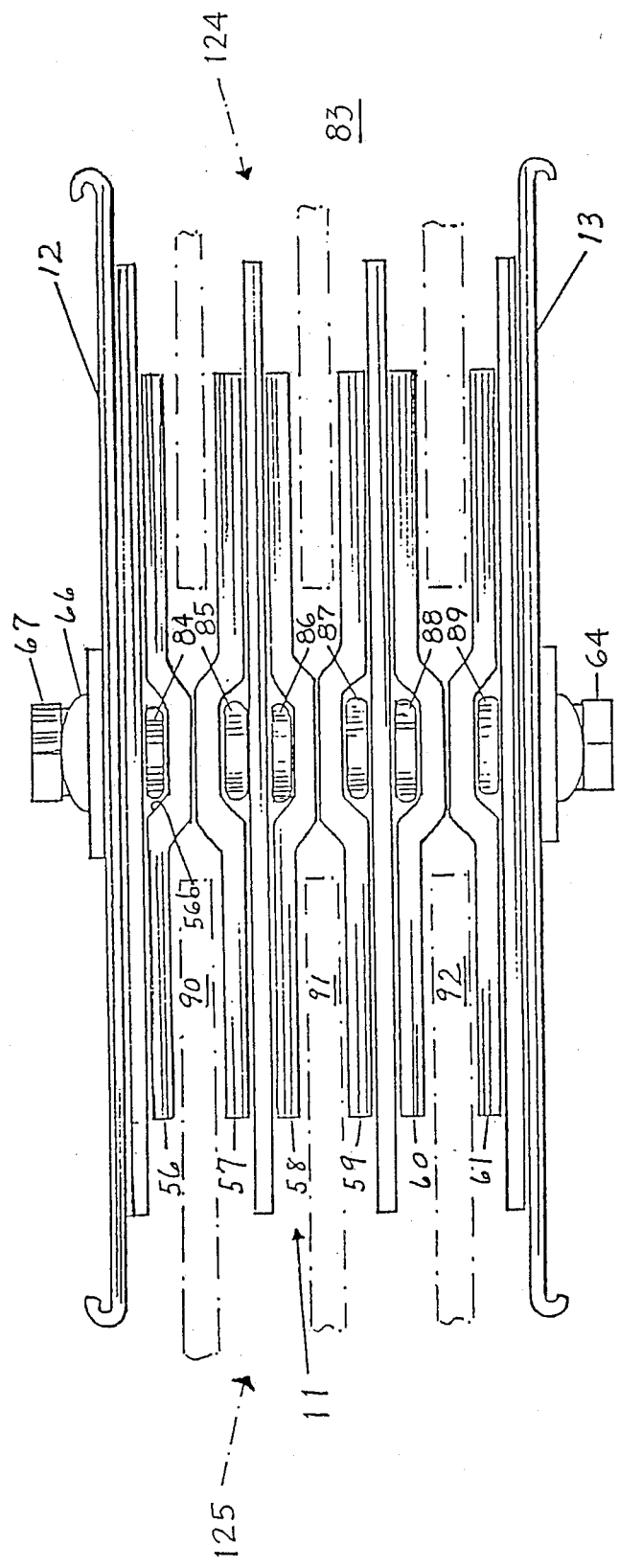
FIG. 7 is an end view iof the single busway joint of FIG. 5 after assembly.

The assembled single busway joint 83 according to the invention is shown in FIG. 7 with the connector module 11 secured to the outer housing plates 12, 13 by means of bolt 64, washers 66 and nut 67 connecting between adjoining busway sections 124, 125, shown in phantom. In a manner similar to that described earlier with reference to FIGS. 2 and 4, busway stab spaces 90, 91, 92 are defined within the adjoining splice plates 56, 57; 58, 59; and 60, 61. A similar plurality of elastomeric washers 84–89 are inserted within corresponding recesses such as 56B.

Figure 8:
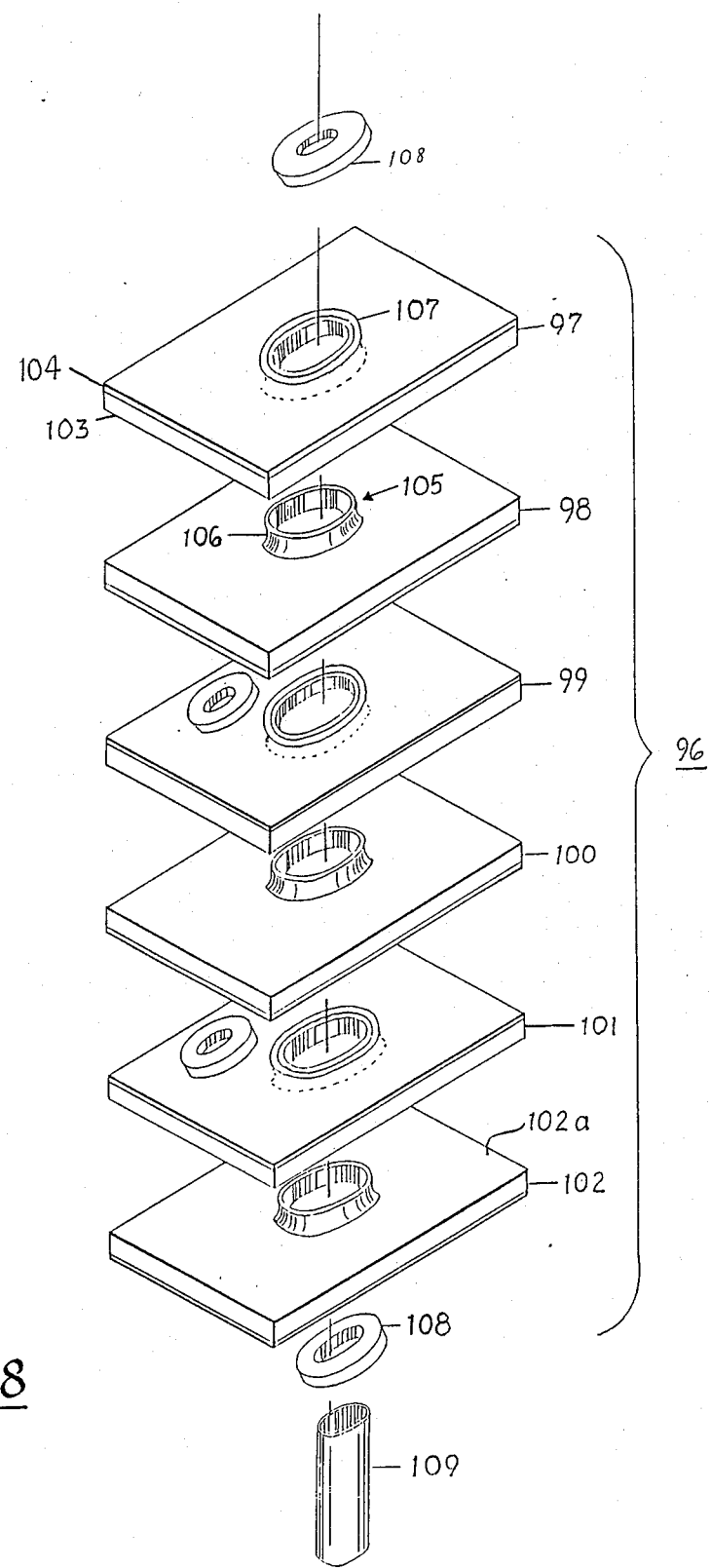
FIG. 8 is a top perspective view of an alternate embodiment of the connector module within the single busway joint of FIG. 5.

A compact connector module 96 is shown in FIG. 8 wherein a plurality of combined insulating-spice plates 97–102 are arranged prior to assembly by means of the oval insulating tube 109. The insulating-splice plates are similar to those depicted earlier in that each have an apertured depression 105 formed therein by a stamping or extrusion process. The apertured depression defines a projection 106 and a recess as indicated at 107. After the metal sheet that comprises the metallic surface 103 is formed with the apertured depression, an insulative coating 104 is then applied to one side of the metal plate while the side that contains the projection is left uncoated to provide an electrically contacting surface such as illustrated at 102A, for example. The insulative coating consists of an epoxy compound that is applied electrostatically or by a fluidized bed technique. In order to provide increased electrical insulation between alternative pairs of insulating-splice plates, an elastomeric washer 108 can be inserted within each of the recesses. The sides of the insulating-splice plates that contain the projections, are arranged with the projections in abutment with each other as described earlier. The oval-shaped tube 109 which can comprise a plastic or rubber composition is then inserted through the elastomeric washers and the insulating-splice plates to provide additional insulation between the insulating-splice plates as well as to further insulate the bolt which fastens the connector module to the outer housing plates 12, 13 such as described earlier with reference to FIG. 3, for example.

Figure 9A:
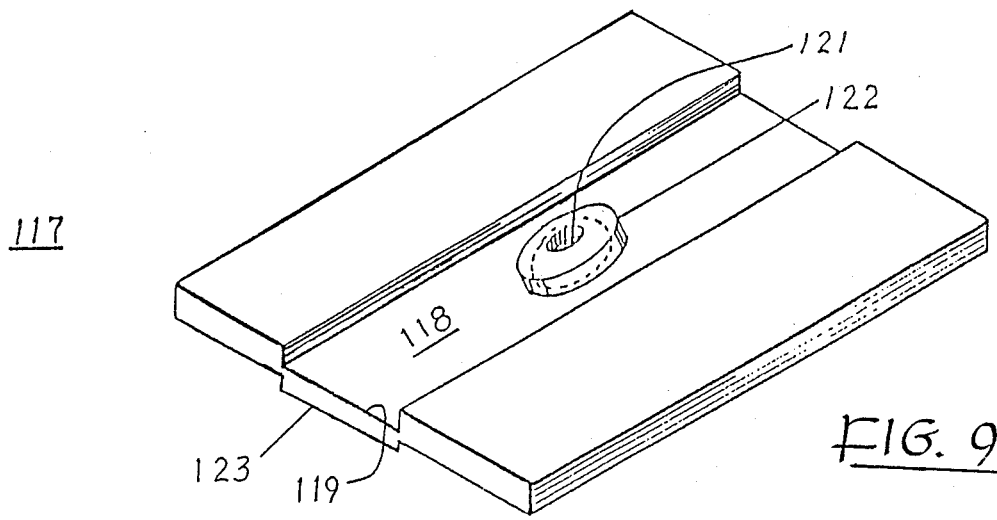
FIG. 9A is a top perspective view of an alternate arrangement of a splice plate according to the invention.
Figure 9:
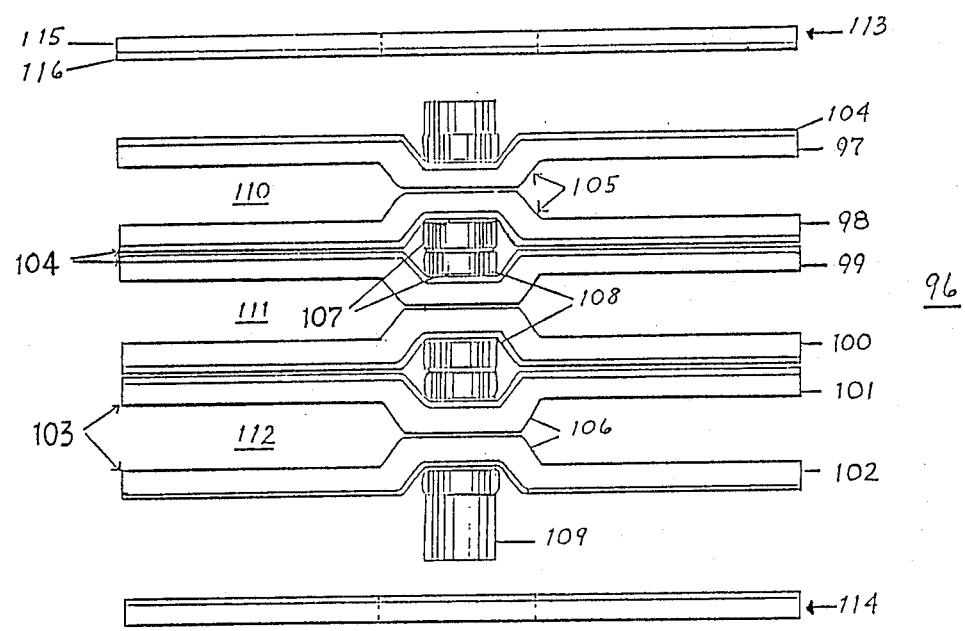
FIG. 9 is a side view of the connector module of FIG. 8 prior to attachment to the joint side plates.

The assembled compact connector module 96 is depicted in FIG. 9 to show the arrangement of the insulating-splice plates 97–102 to define corresponding bus stab spaces 110, 111, 112 as indicated. As described earlier, each pair of adjacent insulating-splice plates connect with a different phase of a multi-phase power distribution system. It is essential therefore, to insulate between the adjacent phases as well as between the phases and the outer housing plates. By positioning the apertured depressions 105 such that the projections 106 are in proximate abutment and the recesses 107 are in distal displacement, the epoxy coating 104 is now sufficient to provide adequate inter-phase insulation. As described earlier, the elastomeric washers 108 increase the distance between the metallic surfaces 103 to further improve the inter-phase insulation.

A pair of insulating-conducting joint outer side plates 113, 114 can be used with the connector module 96 to improve the insulation provided between the connector module and the outer side plates. The metallic surface 115 is arranged toward the exterior of the joint to provide electrical continuity between the ground connections on each abuting electrical busway section (not shown) while the insulating coating 116 is arranged toward the insulating coating 104 of the outermost insulating-splice plates 97, 102.

An alternate arrangement of the splice plate according to the invention is depicted at 117 in FIG. 9A. This splice plate is extruded or otherwise shaped to provide a channel 118, as indicated. The channel defines a projecting side 123 which functions similar to the projections depicted earlier with reference to FIG. 2, for example. A recess side 119 functions similar to the recess also described earlier. The elastomeric washer 122 is inserted within the recess side around the oval-shaped opening 121 to provide added insulation to the recess side.

Also described are insulating-splice plates having apertured depressions wherein the recess side of the insulating-splice plate is coated with an epoxy insulating material and a part of the projection side is left uncoated. The projections and recesses are oriented to define bus receiving spaces that are insulated from each other by means of the epoxy coating as well as by elastomeric washers.

It has thus been shown that simplified insulative plates formed from a glass-filled polyester material such as in the form of a glass material base laminate polyester in combination with metal splice plates having recessed oval apertures stamped therein can be used to form a connection module for busway joints. The recesses formed on one side of each splice plate multi-functionally receive an elastomeric washer to provide improved insulative properties while a projection formed on the opposite surface thereof cooperates with an opposing projection on the next opposing splice plate to define spaces for receiving the busway stabs.

Having thus described my invention, what I claim as new and desire to secure by Letters Patent is:

1. A method of forming an electric busway joint comprising the steps of:
   providing a pair of apertured outer metallic plates;
   forming a plurality of metallic splice plates having apertured depressions therethrough, each of said depressions forming a projection on one surface of a said splice plate and a recess on an opposing surface thereof;
   providing a plurality of apertured insulating plates;
   arranging pairs of said metallic splice plates whereby a said projection on one of said splice plates of each said pair abuts a said projection on the other of said splice plates on each respective pair to define a bus-receiving space therebetween;
   interleaving each said pair of said splice plates between a corresponding pair of said insulating plates;
   inserting an insulating tube through said aperture of each of said splice plates and said insulating plates; and
   inserting a bolt through said insulating tube said splice plates and said insulating plates to fasten said metallic splice plates, said insulating plates and said outer metallic plates together.

2. The method of claim 1 including the step of inserting an elastomeric washer within each of said apertured depressions.

3. The method of claim 1 including the step of applying an adhesive material to said insulating plates and said insulating tube.

4. An electric busway joint comprising:
   first and second apertured outer metallic plates; and
   a connector module fastened between said first and second outer metallic plates, said connector module including a pair of first metallic insulating-splice plates having first apertured depressions formed therein, each said first depression comprising a first projection on an electrically conducting surface of a respective said first splice plate and a first recess on an electrically insulating opposing surface thereof, each of said first projections being arranged in abutment with each other to define a first bus-receiving space, a pair of second metallic insulating-splice plates having second apertured depressions formed therein, each said second depression comprising a second projection on an electrically conducting surface of a respective said second splice plate and a second recess on an electrically insulating opposing surface thereof, each of said second projections being arranged in abutment with each other to define a second bus-receiving space, a pair of third metallic insulating-splice plates having third apertured depressions formed therein, each said third depression comprising a third projection on an electrically conducting surface thereof and a third recess on an electrically insulating opposing surface of a respective said third splice plate, each of said third projections being arranged in abutment with each other to define a third bus-receiving space.

5. The electric busway joint of claim 4 wherein each of said first, second and third insulating-splice plates include an insulative coating on each said opposing surface.

6. The electric busway joint of claim 4 including a bolt fastening said first and second outer metallic plates to said connector module.

7. The electric busway joint of claim 4 including an insulating tube passing through said first, second and third metallic insulating-splice plates for providing additional insulation between said first, second and third pairs of metallic insulating-splice plates and between said metallic insulating-splice plates and said bolt.

8. The electric busway joint of claim 6 wherein said first, second and third apertured depressions comprise an oval-shaped cross-section.

9. The electric busway joint of claim 4 wherein said first, second and third metallic insulating-splice plates comprise aluminum.

10. The electric busway joint of claim 4 including an elastomeric washer abutting each of said apertured depressions for providing additional insulation between said first, second and third metallic insulating-splice plates.

11. The electric busway joint of claim 10 wherein each said elatomeric washer nests in one of said corresponding recesses.

12. The electric busway joint of claim 10 wherein each said elastomeric washer comprises rubber or plastic resin.

13. The electric busway joint of claim 8 wherein said first, second and third metallic insulating-splice plates comprise stamped rectangular plates.

14. The electric busway joint of claim 4 wherein said first and second apertured outer metallic plates include an insulative coating on one side thereof.

15. The electric busway joint of claim 13 wherein said insulative coating side on said first outer metallic plate faces said opposing surface of one of said first, second or third metallic insulating-splice plates and said insulative coating side on said second outer metallic plate faces another said opposing surface of said first, second or third metallic insulating-splice plates.

16. The electric busway joint of claim 4 wherein said first apertured depressions comprises a channel formed within said first metallic insulating splice plates.

17. A method of forming an electric busway joint comprising the steps of:
providing a pair of apertured outer metallic plates;
forming a plurality of metallic insulating-splice plates having apertured depressions therethrough which depressions define a projection on one surface of each of said splice plates and a recess on an opposite surface of each of said splice plates;
coating said opposite surfaces with an insulative material;
arranging pairs of said metallic insulating-splice plates whereby one of said projections of each said pair abuts another of said projections on each respective pair to define a bus-receiving space between each pair of said splice plates;
inserting an insulating tube through each of said metallic insulating splice plates; and
inserting a bolt through said insulating tube and said metallic insulating-splice plates and said outer metallic plates to fasten said metallic insulating-splice plates and said outer metallic plates together.

18. The method of claim 17 including the step of inserting an elastomeric washer within each of said recesses.

* * * * *